(12) United States Patent
Ossanai

(10) Patent No.: US 8,444,792 B2
(45) Date of Patent: May 21, 2013

(54) METHOD OF MANUFACTURING AEROGENERATOR BLADES

(75) Inventor: Leo Ossanai, Sorocaba (BR)

(73) Assignee: Tecsis Tecnologia E Sistemas Avançados Ltda, Sorocaba (BR)

( * ) Notice: Subject to any disclaimer, the term of this patent is extended or adjusted under 35 U.S.C. 154(b) by 0 days.

(21) Appl. No.: 13/203,620

(22) PCT Filed: Feb. 26, 2009

(86) PCT No.: PCT/IB2009/050790
§ 371 (c)(1),
(2), (4) Date: Aug. 26, 2011

(87) PCT Pub. No.: WO2010/097657
PCT Pub. Date: Sep. 2, 2010

(65) Prior Publication Data
US 2011/0308703 A1    Dec. 22, 2011

(51) Int. Cl.
*F03D 11/02*    (2006.01)

(52) U.S. Cl.
USPC ............. 156/93; 156/148; 112/402; 112/423; 112/422; 112/428; 264/239; 264/241; 264/257; 264/258; 264/259; 264/271.1; 264/279.1

(58) Field of Classification Search
USPC .................... 156/93, 148; 112/402, 423, 422, 112/428; 264/239, 241, 257, 258, 259, 269, 264/271.1, 279.1
See application file for complete search history.

(56) References Cited

U.S. PATENT DOCUMENTS

| 4,867,086 A * | 9/1989 | Vees et al. ................ 112/475.04 |
| 2004/0253114 A1 | 12/2004 | Gunneskov et al. |
| 2007/0251090 A1 | 11/2007 | Breugel et al. |
| 2008/0219851 A1 * | 9/2008 | Althoff et al. ................ 416/226 |

OTHER PUBLICATIONS

Wind Energy Handbook; Tony Burton, et al.; John Wiley & Sons, Ltd.; Copyright 2001; pp. 376-419.
International Search Report, PCT/IB2009/050790; Feb. 26, 2009.

* cited by examiner

*Primary Examiner* — Jeff Aftergut
*Assistant Examiner* — Jaeyun Lee
(74) *Attorney, Agent, or Firm* — Sughrue Mion, PLLC

(57) ABSTRACT

Method of manufacturing aerogenerator blades that avoids or reduces some formation deficiencies existing in the traditional methods of manufacturing aerogenerator blades. The method comprises: positioning at least one support plate (2) on a plug (3) corresponding to a predetermined shape of at least a portion of the blade; removably fixing the support plate (2) to the plug (3); stacking a plurality of layers (1) of at least one material over the support plate (2); stitching the plurality of layers (1) to the support plate (2); displacing the plurality of layers (1) stitched to the support plate (2) into a mold (4), the mold (4) having a shape corresponding to the counter shape of the plug (3).

14 Claims, 3 Drawing Sheets

METHOD OF MANUFACTURING AEROGENERATOR BLADES

TECHNICAL FIELD

This invention relates generally to aerogenerator blades and more specifically to methods and apparatus for manufacturing blades, and the respective blades.

BACKGROUND ART

Wind power has emerged as a highly competitive form of renewable energy. Wind power is frequently produced by large generators comprising a vertical structure on top of which is located at least one horizontal axis wind turbine that includes one, two, three or multiple rotor blades. Wind power generators or simply 'aerogenerators' are designed to exploit wind energy existing at a particular location and therefore vary in height, control system, number of blades, blade orientation, shape and materials. Descriptions of the methods and apparatus for manufacturing aerogenerator blades may be found in the prior art, for instance, in the Handbook of Wind Energy, Burton el at., John Wiley & Sons Ltd, 2001, Chapter 7.1., as well as in US Patent Applications Publication No. 2004/0253114A1 and 2007/0251090A1. As mentioned in US2004/0253114A1, it may be difficult and/or time-consuming to form some components of the rotor blade shells, for example, spar caps, core material, and/or root section supports, such that they will both sufficiently support the rotor blade shell and be formed into the predetermined aerodynamic shape, for example, because of the size of the layers, local variations in resin content, local variations in a curvature of the layers, and/or local variations in strains exerted on the shell during fabrication thereof. One possible approach for such problem, as described in US2004/0253114A1, is laying up pultrusions, i.e. a mix of fibers and matrix that is cured after formation, with wood fibers in a mould and laminating them together.

DISCLOSURE OF INVENTION

Technical Problem

The embodiments described in the cited documents and in other prior art do not sufficiently address the numerous problems associated with the manufacturing of aerogenerator blades. More particularly, when stacking preformed or prefabricated parts of the blades in the mould, those prefabricated and preformed parts may have formation deficiencies, such as waviness due to slipping of layers prior complete curing. Waviness in composite material is extremely harmful because it reduces the strength against fatigue.

Technical Solution

To overcome the drawbacks and problems described above and other disadvantages not mentioned herein, in accordance with the purposes of the invention, as embodied and broadly described herein, one aspect of the present invention is directed to a method of manufacturing aerogenerator blades, the method comprising: positioning at least one support plate on a plug corresponding to a predetermined shape of at least a portion of the blade; removably fixing the support plate to the plug; stacking a plurality of layers of at least one material over the support plate; stitching the plurality of layers to the support plate; displacing the plurality of layers stitched to the support plate into a mould, the mould having a shape corresponding to the counter shape of the plug.

Advantageous Effects

The present invention has several advantages over the prior art. By not displacing the layers directly into the mould, but rather firstly in a support plate fixed to a plug, and stitching the plurality of layers to the support plate and displacing the plurality of layers stitched to the support plate into a mould, the support plate and stitches avoid the possibility of the layers to slip off, therefore maintaining the predetermined shape without waves. Moreover, as the method provides an increased compression of the layers the layers/resin proportion will have a better controlled ration, resulting in improved mechanical properties of the laminate.

DESCRIPTION OF DRAWINGS

The accompanying drawings are not necessarily drawn on scale. In the drawings, each identical or nearly identical component that is illustrated in various figures is represented by a like numeral. For purposes of clarity, not every component may be labelled in every drawing.

MODE FOR INVENTION

Figure 1:
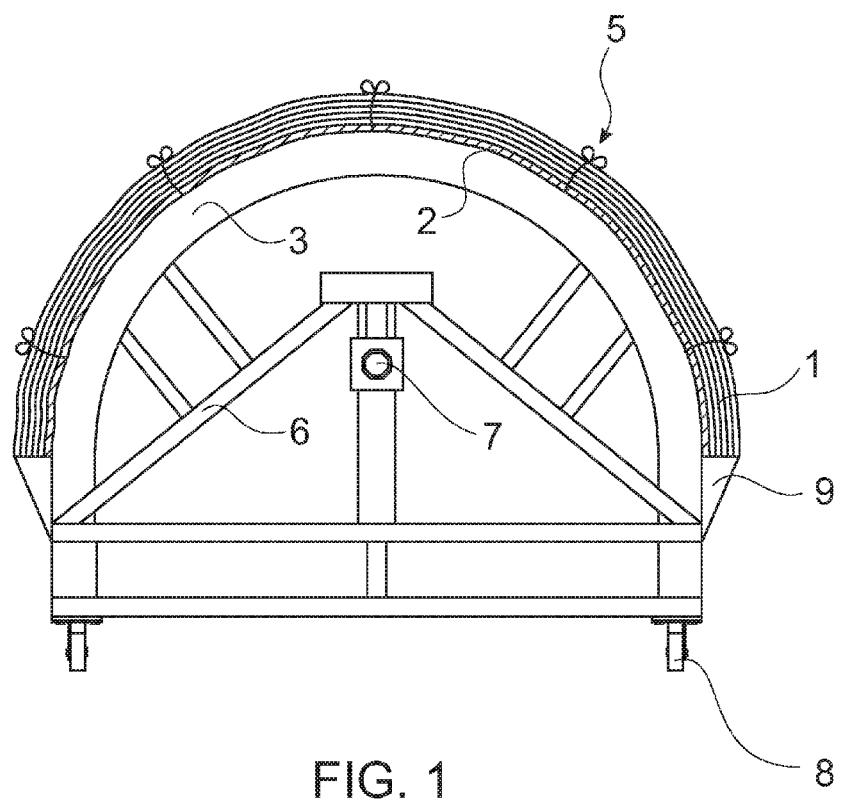
FIG. 1 is a frontal view of a plug with layers according one aspect of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of 'including', 'comprising', 'having', 'containing' or 'involving', and variations thereof herein, is meant to encompass the items listed thereafter and equivalents thereof as well as additional items.

Aerogenerator blades usually have an airfoil shape, including a shell, which corresponds to the airfoil shape, and internal structural members, such as spar caps (which may be a part of the shell) and box beam members.

FIG. 1 illustrates one aspect of the method of manufacturing aerogenerator blades, more particularly, a method of manufacturing a root portion of an aerogenerator blade, the blades being composed of a plurality of layers (1) of materials. The layer (1) material may comprises one or more layers of metal, plastic, wood, a fiber fabric, a composite of fiber and resin, or a combination thereof. In the case of fiber fabric, it may comprise a glass fiber, a carbon fiber, an aramid fiber, a polyester fiber or a combination thereof. However, a skilled in art of aerogenerator blades manufacturing may readily combine other materials and processes.

As shown, at least one support plate (2) is positioned onto a plug (3) corresponding to a predetermined shape of at least a portion of an aerogenerator blade, which in this case is a root portion. The support plate (2) can be rigid, semi-rigid or flexible and capable of being pre-curved according to a predetermined shape. The support plate (2) comprises one or more layers of wood, plastic, polymer foam, or a combination thereof. In the case of wood, it is very advantageous using balsa, or an engineered wood, such as, medium-density fibreboard (MDF) or medium-density particleboard (MDP).

The method of manufacturing aerogenerator blades further comprises removably fixing the support plate (2) to the plug (3). In order to allow the removable fixing of the support plate (2) to the plug (3), it is advantageous to have a plurality of perforations in the support plate (2) that allow the passage of stitches (5). The perforations can be heterogeneously and/or homogenously distributed throughout the plate, depending upon the design of the blade, method of curing and other factors. The support plate shall somehow allow the passage of the resin used in a curing process, such as an epoxy resin, a vinylester resin, a polyester resin or a combination thereof. Nevertheless, other permeable materials may be used as support plates.

The method of manufacturing aerogenerator blades further comprises stacking a plurality of layers of at least one material over the support plate (2).

Figure 2:
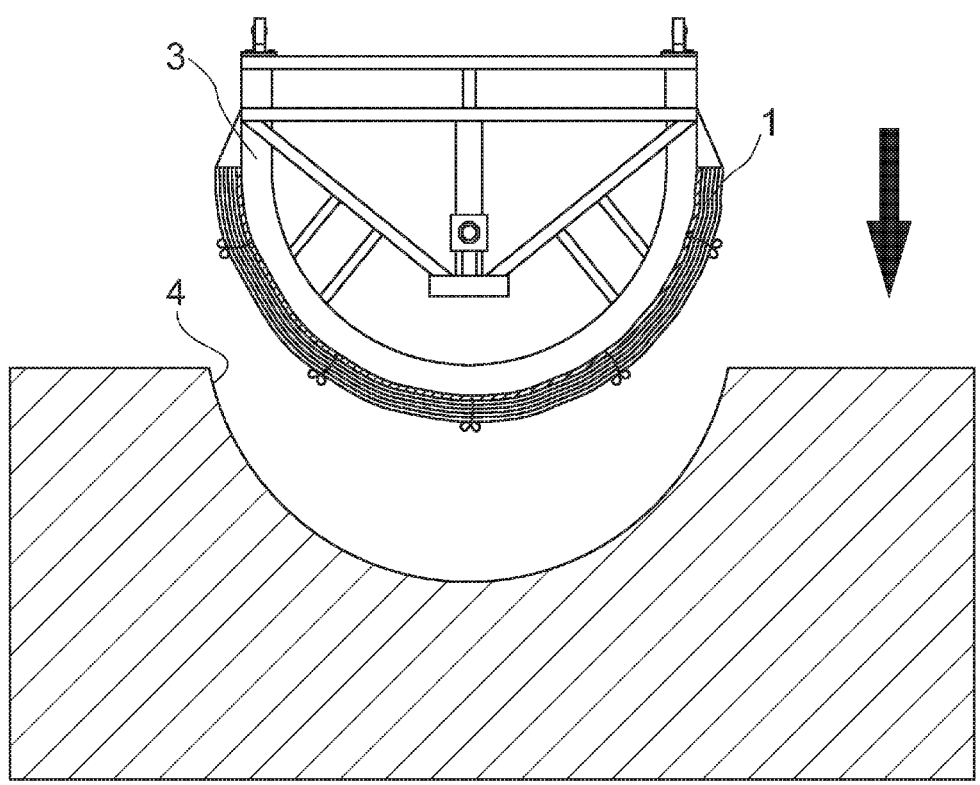
FIG. 2 is a frontal view of a plug with layers being turned over a mould according one aspect of the invention.
Figure 3:
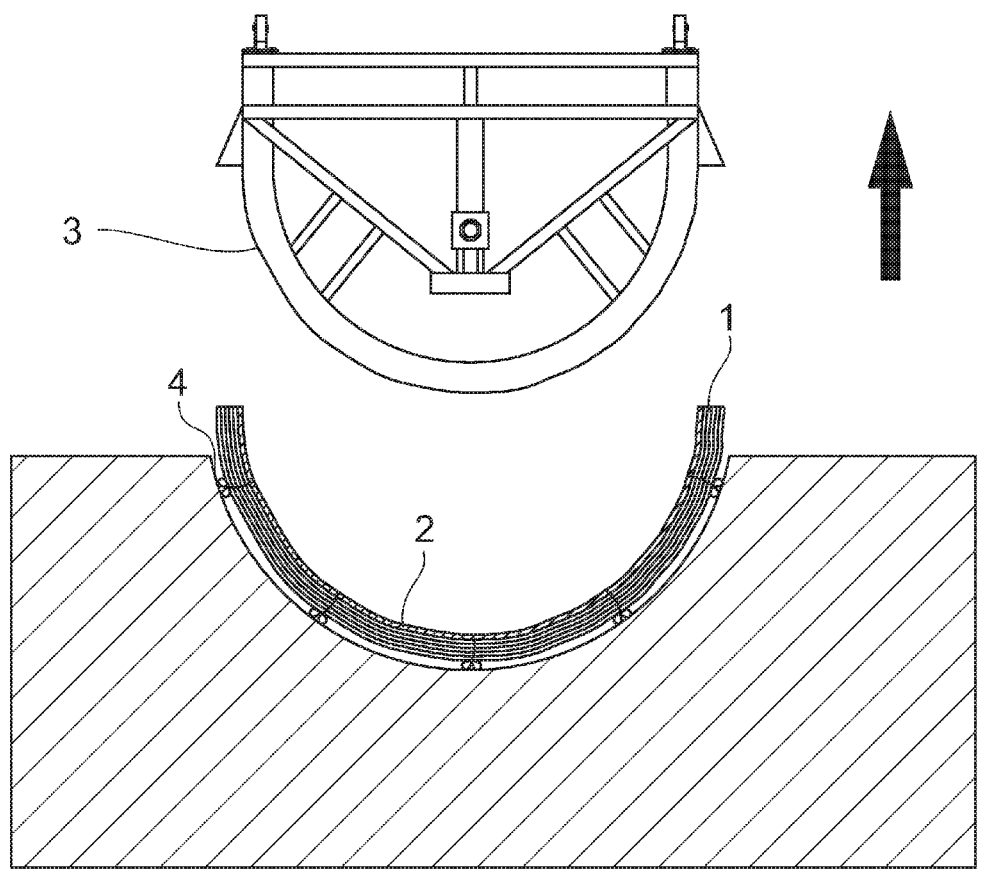
FIG. 3 is a frontal view of a plug after displacement of the layers in the mould.

The method of manufacturing aerogenerator blades further comprises stitching the plurality of layers (1) on the support plate (2) and, as shown in FIG. 2 and FIG. 3, displacing the plurality of layers (1) stitched to the support plate (2) into a mould (4), the mould (4) having a shape corresponding to the counter shape of the plug (3). The stitches (5) allow the layers (1) to be kept fixed when the plug is rotated in its axis. The exemplary plug of FIGS. 1-3 comprises a frame (6) and a turning axis (7), in which, for instance, a crane or turning mechanism can be connected for rotating the plug (3) and placing it over the mould. The plug (3) may also comprise additional features, such as wheels (8) for movement and lateral supports (9) for adding the fixture of the layers (1) on the plug.

At least one component used for manufacturing blades, such as a micro-porous membrane used as transfer material for resin infusion, can be placed over the mould (4) surface prior to the displacement of the plurality of layers (1) stitched to the support plate (2) into the mould (4). However, a skilled in art of aerogenerator blades manufacturing may readily combine other materials and processes.

The method of manufacturing aerogenerator blades can further comprise lamination of at least part of the layers (1) with resin. The lamination of the layers (1) and the resin can comprise at least one process of resin transfer molding (RTM), resin film infusion (RFI), heating, pressure application or a combination thereof.

The method of manufacturing aerogenerator blades as described herein may include other steps for obtaining a finished aerogenerator blade, and this method is especially advantageous for manufacturing some parts of the blade separately, particularly more curved parts such as roots, where there is a tendency for the layers to slip off and cause waves.

Hence, by not displacing the layers (1) directly into the mould (4), but rather firstly over a support plate (2) fixed to a plug (3), and stitching the plurality of layers (1) to the support plate (2) and displacing the plurality of layers (1) stitched to the support plate (2) into a mould (4), the support material and stitches avoid the possibility of the layers (1) to slip off, therefore maintaining the predetermined shape without waves. Moreover, as the method provides an increased compression of the layers, the layers/resin proportion will have a better controlled ration, resulting in improved mechanical properties of the laminate. This is particular important in the case of layers of dry fabric.

While the invention has been disclosed by this specification, including its accompanying drawings and examples, various equivalents, modifications and improvements will be apparent to the person skilled in the art. Such equivalents, modifications and improvements are also intended to be encompassed by the following claims.

The invention claimed is:

1. A method of manufacturing aerogenerator blades, said method comprising:
   positioning at least one support plate on a plug corresponding to a predetermined shape of at least a portion of the blade, wherein the support plate is capable of being pre-curved according to a predetermined shape;
   removeably fixing the support plate to the plug;
   stacking a plurality of layers of at least one material over the support plate;
   stitching the plurality of layers to the support plate;
   displacing the plurality of layers stitched to the support plate into a mould, the mould having a shape corresponding to the counter shape of the plug; and
   hardening the molded material.

2. The method according to claim 1, wherein the support plate comprises a plurality of perforations that allow passage of the stitches.

3. The method according to claim 2, wherein the perforations are heterogeneously distributed throughout plate.

4. The method according to claim 2, wherein the perforations are homogeneously distributed throughout plate.

5. The method according to claim 2, wherein the support plate allows passage of the resin used in a curing process.

6. The method according to claim 2, wherein the support plate allows the passage of the resin through the perforations.

7. The method according to claim 5 or 6, wherein the resin comprises an epoxy resin, a vinylester resin, a polyester resin or a combination thereof.

8. The method according to claim 1, wherein the support plate comprises one or more layers of wood, plastic, polymer foam, or a combination thereof.

9. The method according to claim 8, wherein the support plate comprises an engineered wood, balsa or a combination thereof.

10. The method according to claim 1, wherein the layer material comprises one or more layers of metal, plastic, wood, a fiber fabric, a composite of fiber and resin, or a combination thereof.

11. The method according to claim 1, wherein the fiber fabric comprises a glass fiber, a carbon fiber, an aramid fiber, a polyester fiber or a combination thereof.

12. The method according to claim 1, wherein at least one component used for manufacturing blades is placed over the mould surface prior to the displacement of the plurality of layers stitched to the support plate into the mould.

13. The method according to claim 1, further comprising lamination of at least part of the layers with resin.

14. The method according to claim 1, wherein the lamination of the layers and the resin comprise at least one process of resin transfer molding (RTM), resin film infusion (RFI), heating, pressure application or a combination thereof.

* * * * *